United States Patent [19]
Ireland

[11] Patent Number: 5,954,446
[45] Date of Patent: Sep. 21, 1999

[54] BREAKAWAY TOOL COUPLER FOR ROBOT ARM

[76] Inventor: Randy L. Ireland, 3100 Santa Maria Dr., Concord, Calif. 94518

[21] Appl. No.: 08/835,999

[22] Filed: Apr. 11, 1997

[51] Int. Cl.[6] .................................................... B25G 3/00
[52] U.S. Cl. ........................ 403/11; 403/DIG. 1; 901/49
[58] Field of Search ................................ 403/DIG. 1, 11; 248/683, 206.5; 414/730; 901/41, 42, 46, 49

[56] References Cited

U.S. PATENT DOCUMENTS

| | | | |
|---|---|---|---|
| 4,635,328 | 1/1987 | Palmer | 901/49 X |
| 4,700,932 | 10/1987 | Katsuno | 901/49 X |
| 4,714,865 | 12/1987 | Chin et al. | 901/49 X |
| 4,717,003 | 1/1988 | McCormick et al. | 414/730 X |
| 4,842,114 | 6/1989 | Hepp | 901/49 X |
| 4,860,864 | 8/1989 | Cwycyshyn et al. | 901/49 X |
| 4,995,493 | 2/1991 | Cotsman et al. | 403/DIG. 1 X |

Primary Examiner—Kenneth J. Dorner
Assistant Examiner—William Miller
Attorney, Agent, or Firm—Bielen, Peterson & Lampe

[57] ABSTRACT

A breakaway unit for a tool mount of a robotic positioner, the breakaway unit having a magnetic coupler mechanism and a mechanical coupler mechanism for omnidirectional collision contacts of the tool and/or tool mount, the magnetic coupler mechanism having an adjustably positioned magnetizable disk in one coupler component and a fixed position magnet member in the other coupler component and the mechanical coupler mechanism having an adjustment mechanism for adjusting the force of release in the +Z direction of contact by the tool.

15 Claims, 4 Drawing Sheets

BREAKAWAY TOOL COUPLER FOR ROBOT ARM

BACKGROUND OF THE INVENTION

This invention relates to a breakaway unit for coupling a tool holder to the wrist of a robot arm.

Many procedures used in industrial processes can be performed with robots, particularly where procedures are repetitive or can be programmed for continuous operation. The present invention primarily relates to a breakaway unit for an industrial robot. However, the concepts and structure described herein can be applied to any robot having a tool holder where contact by the tool or holder can be determined to the object being worked, or to the tool or holder at the end of a robot arm. By modifying the size and construction of the unit, the breakaway coupler can be applied to robots used in science and medicine as well as robots used in specialty environments where conditions require an inanimate device to manipulate objects. Since safety couplers are a virtual necessity for powerful industrial robots, a variety of different mechanisms have been proposed for releasing the tool and tool mount at the wrist connection at the distal end of the robot arm.

In particular, the preferred embodiment of this invention is advantageously employed as a coupling device of the class referred to the industry as a breakaway, shock sensor, load limiter, collision sensor, torch mount, safety mount or other such term.

Modern industrial robots are fast, powerful and expensive. With an inertial base commonly weighing 10–40 times their own maximum payload, a payload capacity on the arm can be accelerated in excess of 2 G's. However, a robot cannot instantly stop the travel of the payload instantly during an emergency stop. Even robots having dynamic breaking may not have brakes at all axis (joints) of the robotic positioner, and significant distances may be traveled before stopping. Substantial damage or injury may result to any thing or any person in the path of travel. Most often collisions occur between the robot tool at the distal end of the arm or positioner of the robot another object. Dynamic breaking activated by contact or proximity sensors will not instantly halt travel of the tool and damage to the tool may occur if provision is not made for collision.

Among the mechanisms heretofore constructed to solve this problem are spring devices where coupler elements have a spring loaded engagement. These spring devices generally have the characteristic of increasing forces on the tool as the tool deflects and the resistance springs are compressed before release. Certain couplers have destructible elements that fail upon exceeding a design force. Generally the coupler must be removed and the element replaced before operation can continue.

Other tool mounts allow only a limited range of tool deflection before the deflection mechanism "bottoms out". This range may be insufficient for a high speed or high inertial collision, and damage to the tool or contacted object is likely.

Tool mounts that do provide for reasonable omnidirectional crash protection are complex and expensive, and in general do not provide adjustability for protection of lightweight tools.

Although magnetic couplers have been used in a breakaway tool mount, the units apparently lack a means for adjusting the magnetic coupling force and fail to provide for safe recoupling of a separated unit. Because of the strong magnetic forces required to maintain a unit in a coupled state, injury can occur when fingers interposed between magnetic components during the coupling process.

SUMMARY OF THE INVENTION

The breakaway unit of this invention is devised to provide a coupling between a tool mount and a robot wrist. The invented breakaway unit combines a magnetic coupling mechanism with a mechanical coupling mechanism to provide omnidirectional breakaway of the tool and tool mount from the robotic positioner.

A sophisticated robotic positioner, such as a robot arm, may have multiple axes of pivot and rotation allowing a tool to approach a target object from nearly all directions in three dimensional space. Potential collision of the tool and or tool holder may come from any direction and a protection mechanism must therefore be operable omnidirectionally.

In the invented breakaway unit the magnetic coupling mechanism is adjustable as to breakaway force and is selectively adjustable in specific directions as desired. The magnetic coupling mechanism is not effective in the +Z direction, that is, along the axis of the tool during a compressive contact that tends to force the tool into the mount or robot arm. In such instances, the mechanical coupling mechanism will decouple, separating the tool mount from the robot arm.

The use of magnetic coupling components allows for a limited deflection on contact without irreversible separation of the coupled components. However, once the deflection limit is reached, the magnetic coupling components separate. Spring means, which retain coupled components together, exhibit an increasing force of resistance on deflection, which may be detrimental to a tool on contact with an object. The magnetic coupling components exhibit a decreasing force of resistance on deflection allowing precise control of the force setting for a particular application or tool.

Although the detailed description of the preferred embodiment is directed to a robotic positioner for a welding torch, it is to be understood that the breakaway unit of this invention is adaptable for use on a variety of different industrial, scientific and medical robots for a variety of different applications.

DETAILED DESCRIPTION OF THE PREFERRED EMBODIMENTS

Figure 1:
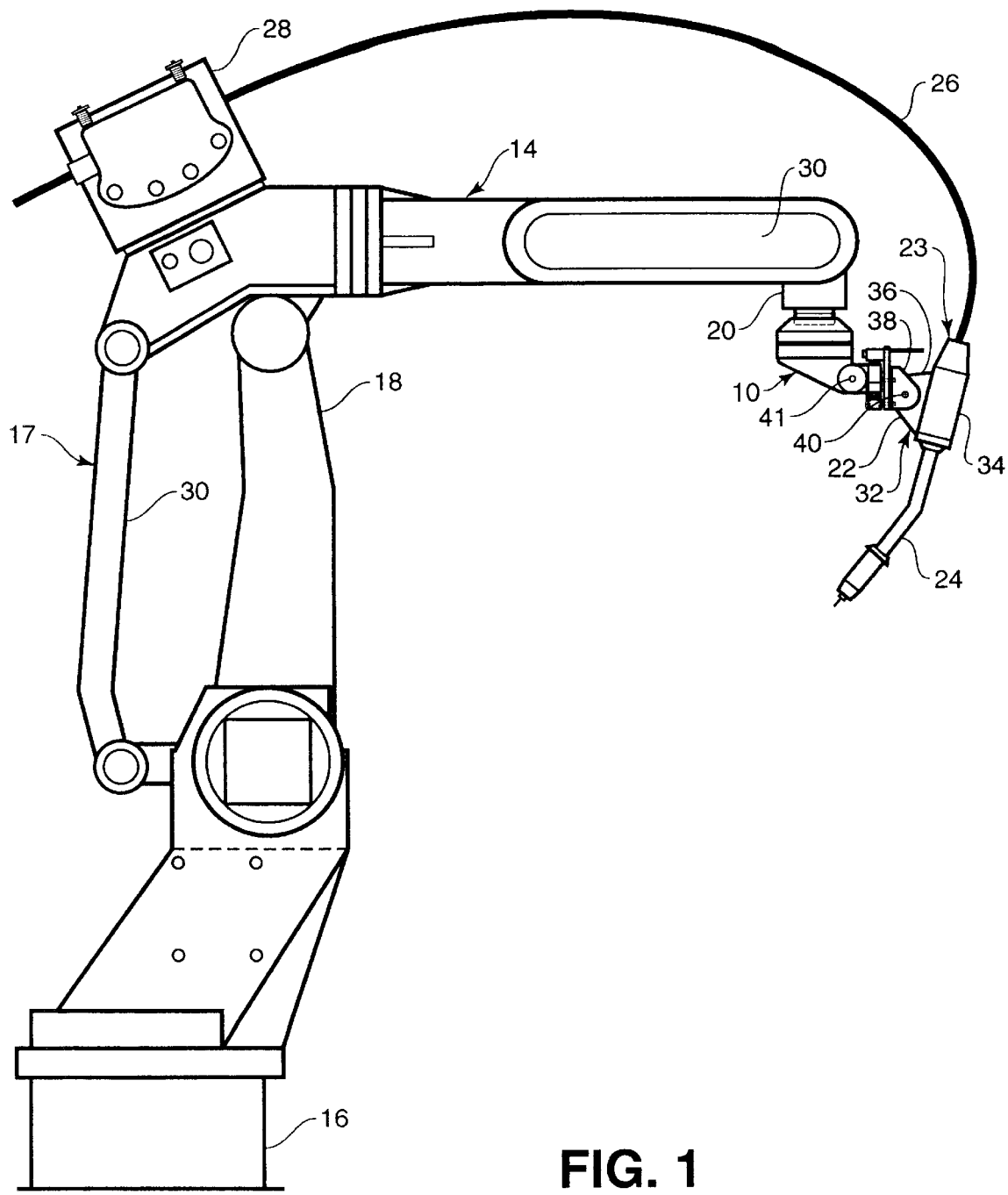
FIG. 1 is a side elevational view of an industrial robot arm and the invented breakaway unit.

Referring to FIG. 1, the breakaway unit, designated generally by the reference numeral 10, is shown connected to an industrial robot 14. The robot 14 is shown with a base mount 16 which is supported on the main body (not shown) of the robot. The robot mount 16 supports a robot positioner 17 that is a multi-axis robot arm 18 with a pivotal wrist 20 at the distal end of the arm 18. The breakaway unit 10 interconnects the robot wrist 20 with a tool mount 22. The tool mount 22 supports a tool 23 which in the preferred embodiment shown, comprises welding torch 24. The welding torch 24 has a hose line 26 supported by a wire-feed mount 28 on the robot arm 18. The robot arm 18 has actuating mechanisms 30 to articulate the arm and hence position the tool 23. Positioning is controlled by a program for operating the robot arm 18 on multiple axis of motion in accordance with the industrial process or procedure to be performed. In this manner the tool 24 may approach a work piece from virtually any direction in three dimensional space.

It is to be understood that the tool mount 22 may be of any configuration to couple a particular type of tool and is fixedly connected to the breakaway unit 10 by a mounting means that may allow for orientation of the tool 23. For example, in FIG. 1 the tool holder 32 has a clamping collar 34 around the welding torch 24 with a support bracket 36 that is pivotally connected to a mounting bracket 38 on the breakaway unit 10. Clamping screws 40 and 41 fix the orientation of the welding torch 24 with respect to the breakaway unit 10 as desired for the prospective operation. The relative position of tool 23 is maintained during operation of the robot arm.

Figure 3:
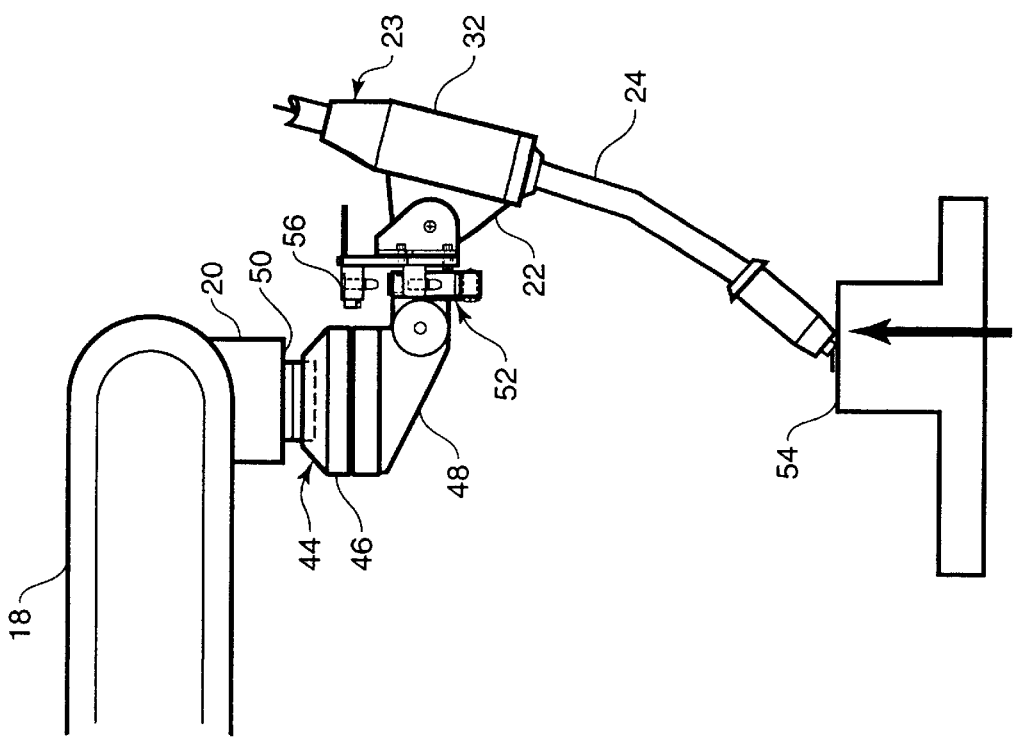
FIG. 3 is a partial view of the robot arm and breakaway unit during partial separation of the mechanical coupler mechanism.
Figure 2:
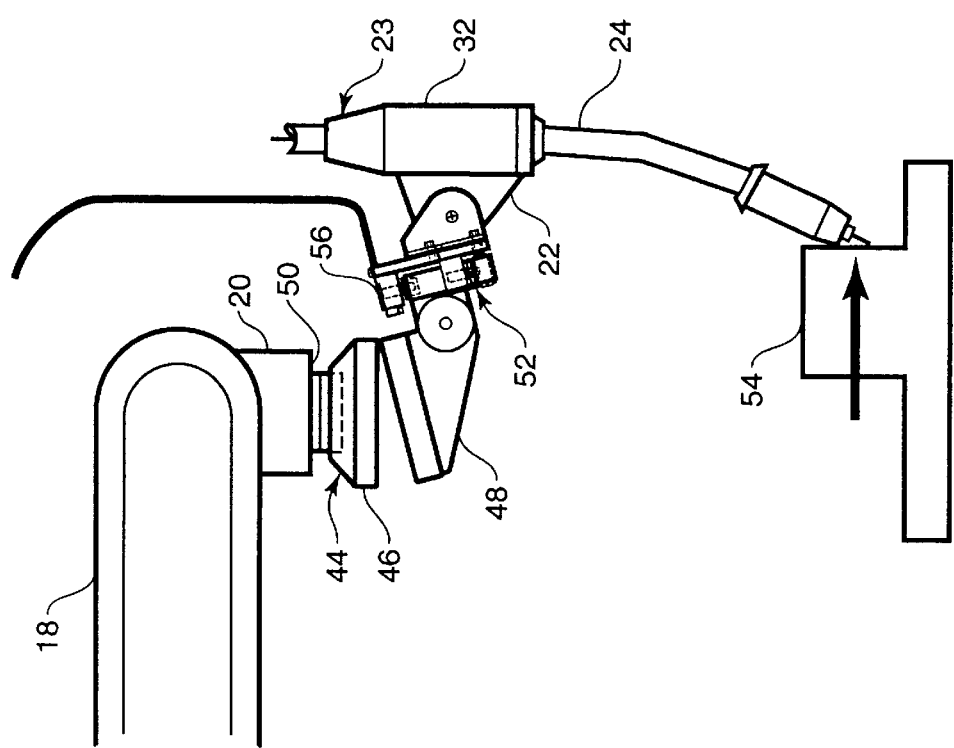
FIG. 2 is a partial view of the robot arm and breakaway unit during partial separation of the magnetic coupler mechanism.

Referring now to FIG. 2, the distal end of the robot arm 18 is shown with the breakaway unit 10 in the process of component separation. The breakaway unit 10 has a magnetic coupler mechanism 44 with two magnetic coupler components 46 and 48 connected, respectively to the robot wrist 20 and to the tool mount 22. The robot wrist coupler component 46 is fixed to the rotatable shaft 50 at the end of the robot arm 18. The tool mount coupler component 48 is connected to the tool holder 32 by a mechanical coupler mechanism 52 that enables the tool holder 32 and tool 23 to separate from the magnetic coupler mechanism 44 and robot arm 18, when the tool 23 is contacted in the +Z direction, as schematically illustrated in FIG. 3. The combination of the magnetic coupler mechanism 44 and the mechanical coupler mechanism 52 provide protection to the tool (and to the object contacted) regardless of the direction from which the tool collides with an object, such as the work piece 54, shown in FIGS. 2 and 3.

When a collision occurs and a separation is initiated, a detection switch 56 signals the robot that emergency shutdown procedures must be initiated. The switch 56 is part of a switch mechanism 58 that is triggered on separation of the mechanical coupler mechanism 52 or the magnetic coupler mechanism 44.

Figure 4:
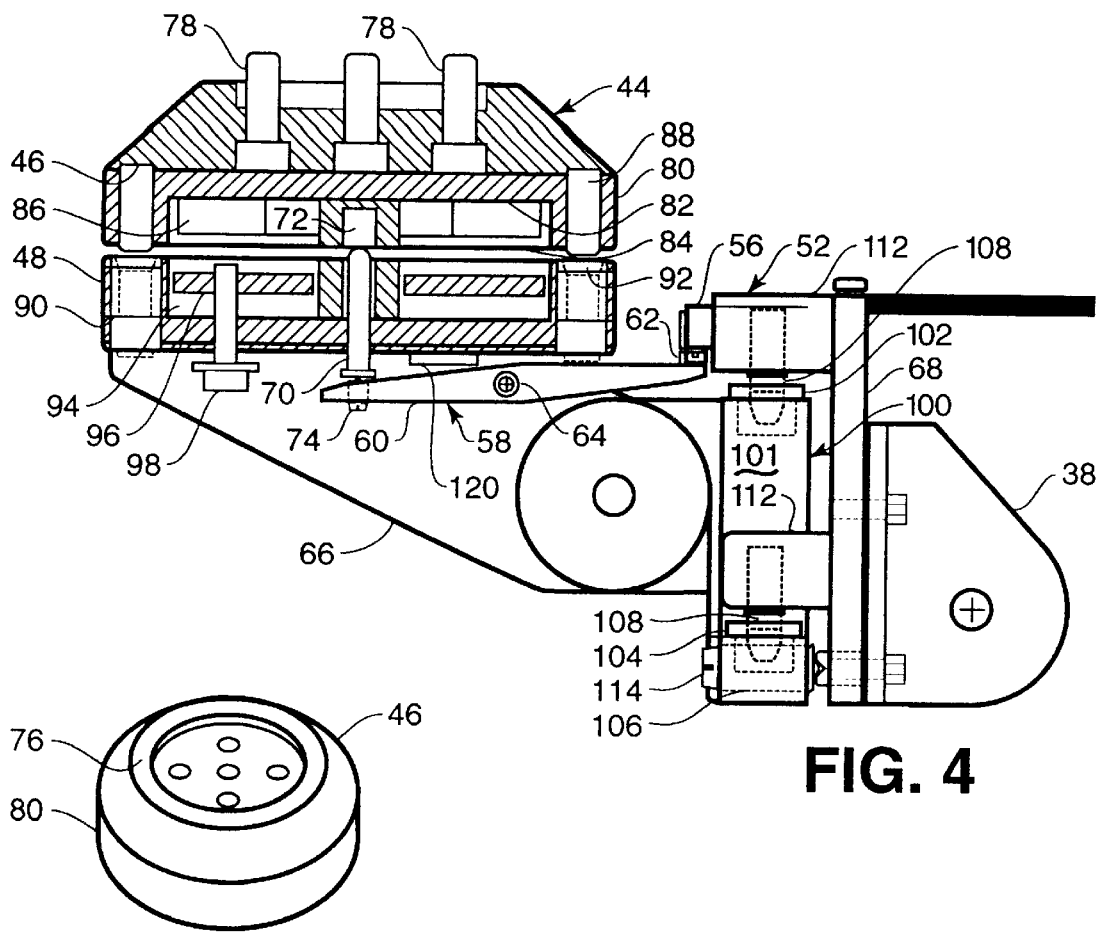
FIG. 4 is an enlarged cross-sectional view of the breakaway unit.

The cross-sectional view of FIG. 4 schematically illustrates both partial separation of the mechanical coupler mechanism 52 and partial separation of the magnetic coupler mechanism 44. Either separation will trigger the switch 56 by relaxing the contact of a rocker arm 60 on a spring loaded contact point 62 in the switch 56. Since the rocker arm 60 has a pivot 64 on the support structure 66 of the tool mount coupler component 48 and the switch 56 is mounted to the breakaway component 68 of the mechanical coupler mechanism 52, it is clear that the switch will activate when the breakaway component 68 separates from the support structure 66. The rocker arm 60 also contacts a push pin 70 that projects through the tool mount coupler component 48 and contacts a seat 72 at the center of the robot wrist coupler component 46. When the magnetic coupler components 46 and 48 separate the pin is no longer restrained by the contact seat 72 and the rocker arm 60 pivots. The contact point 62 of the switch is then permitted to displace thereby breaking the circuit and triggering the emergency response of the robot 14. An adjustment screw 74 allows the switch 56 to be activated on the desired degree of deflection of the magnetic coupler mechanism 44 or the mechanical coupler mechanism 52.

Figure 5:
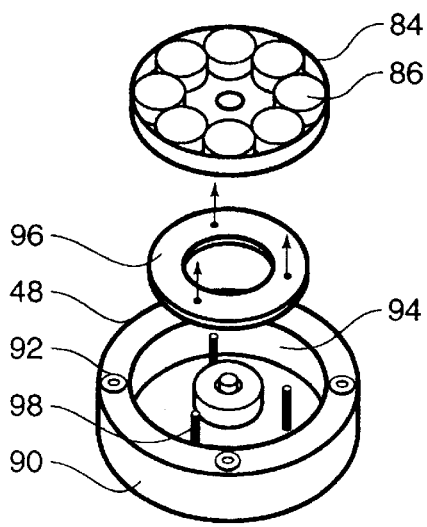
FIG. 5 is an enlarged detail view of a ball plunger adjustment mechanism.

The assembly of the breakaway unit 10 is illustrated in FIG. 4 and in the exploded view of FIG. 5. The robot wrist coupler component 46 has a mounting head 76 with screws 78 that screw into the shaft 50 of the robot arm 18 to securely mount the breakaway unit 10, to the robot 14. The mounting head 76 is coupled to a magnet retainer housing 80 which has a recess 82 in which a cup 84 containing a series of powerful magnets 86 is seated. The magnets are preferably neodyniun rare earth magnets which allow the size of the breakaway unit 10 to be minimized. A set of perimeter pins 88 on the magnet retainer housing 80 provide alignment during coupling of the robot wrist coupler component 46 to the tool mount coupler component 48.

The tool mount coupler component 48 has a ring retainer housing 90 that couples to the magnet retainer housing 80 when the magnetic coupler mechanism 44 is magnetically engaged. The ring retainer housing 90 a series of recesses 92 that are aligned with the pins 88 during coupling. The ring retainer housing 90 has an annular central recess 94 in which is situated a floating magnetizable ring 96 that is positioned with relationship to the magnets 86 in the magnet retainer housing by adjustment screws 98. The adjustment screws 98 are threaded into the ring 96 but are displaceable in the ring retainer housing 90. By adjusting the distance between the ring 96 and the magnets 86 in the cup 84, the effective force required for separation can thereby be adjusted. Furthermore, by positioning the ring 96 at a cant, the force required to dislodge the tool mount coupler component 48 from the robot wrist coupler component 46 may be different for different directions of collision.

Figure 6:
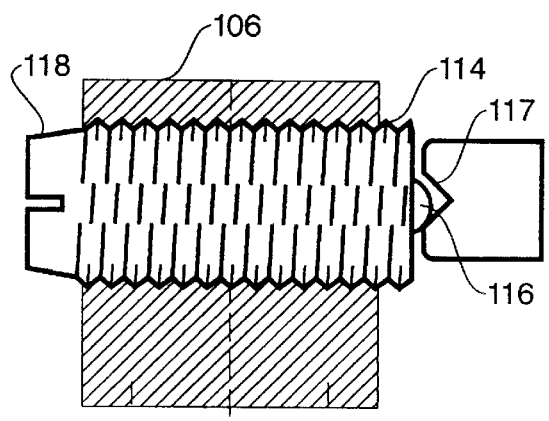
FIG. 6 is an exploded view of the magnetic coupler mechanism.

Similarly, the force required for decoupling the mechanical coupler mechanism 52 in the +Z direction is adjustable. The mechanical coupler 52 has the breakaway component 68 and 100. The seating component 100 is integral with the support structure 66 and has a T-structure 101 with a central top bushing 102 and a pair of spaced bottom bushings 104 on projecting side ears 106 of the T-structure 101. The bushings 102 and 104 are engaged by projecting pins 108 on the breakaway component 68 to provide a three-point engagement of the breakaway component 68 with the seating component 100 to insure alignment. The breakaway component 68 has a mounting plate 110 that supports projecting pin mounts 112 and the tool mount 22 which in this instance comprises a mounting bracket 38 that engages a support bracket 36 on the tool holder 32. To retain the breakaway component 68 in engagement with the seating component 100, a spring-loaded ball plunger 114 on the seating component 100 is positioned with a ball 116 in offset engagement with a detent recess 117 mounted on the support plate 110. The offset of the ball in the detent recess is shown in the detail view of FIG. 5. This positioning provides zero backlash and minimizes the distance to release. Adjustment of the force required for release may be accomplished by repositioning the threaded ball plunger 114 using the screw head 118 visible in the enlarged view of FIG. 6 or by replacing the threaded ball plunger 114 with one having a different spring constant. Alternately, multiple ball plungers may be utilized where a high force of separation is desired in the +Z direction.

Figure 7A:
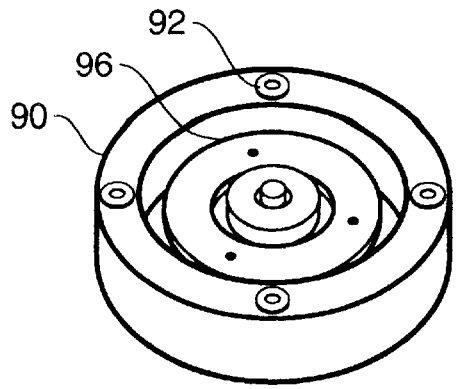
FIGS. 7a & 7b are schematic views of the tool mount component in a first position.
Figure 7B:
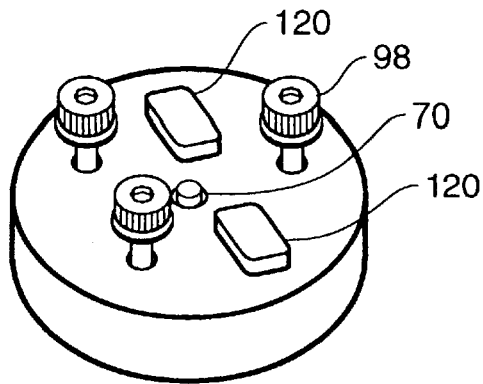
Figure 8A:
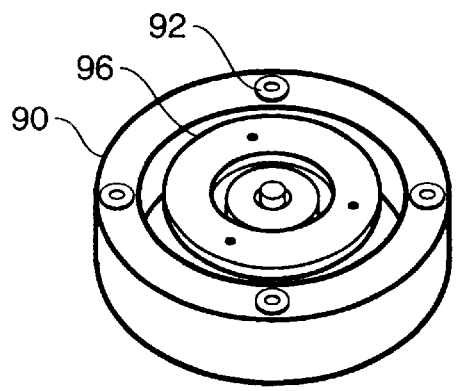
FIGS. 8a & 8b are schematic views of the tool mount component in a second position.
Figure 8B:
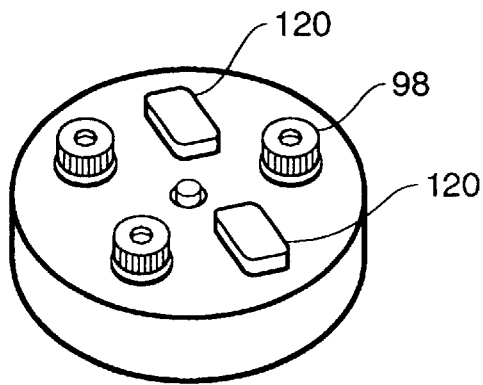

Referring to FIGS. 7A and 7B and FIGS. 8A and 8B, the operation of the unique magnetic coupling mechanism 44 can be appreciated. When the coupling mechanism is uncoupled, the floating ring 96 is retained deep in the ring retainer housing 90 by a pair of weak magnets 120 mounted on the back of the housing 90 as shown in FIG. 7B. Because of the strong attraction of the powerful magnets 86 in the magnet retainer housing 80, coupling of two magnetic components can be dangerous without a safety mechanism. With the magnetizable ring 96 retained in the back of the recess 94, the two coupler components 46 and 48 can be easily joined and aligned with only a weak magnetic force acting between the two components. However, after coupling, when the magnetizable ring 96 is urged toward the powerful magnets 86 in the coupled magnet retainer housing 80 by pressing on one or more of the adjustment screws 98 on the back of the retainer housing, the ring is displaced from the weak magnet 120 and moves towards its operational position as shown in FIG. 8A. In such position the adjustment screws 98 are flush with the ring retainer housing 90 as shown in FIG. 8B.

To break the magnetic coupling of the coupler components 46 and 48, the rocker arm 58 can be employed by pressing on the distal end of the arm opposite the pin 70 to urge the pin against the contact seat 72, which urges the robot wrist component 46 away from the tool mount component 48. Ultimately, in difficult situations the adjustment screws 98 can draw the ring 96 away from the magnets 86 in the robot wrist component, which will weaken the magnetic attraction between the two components.

Figure 9:
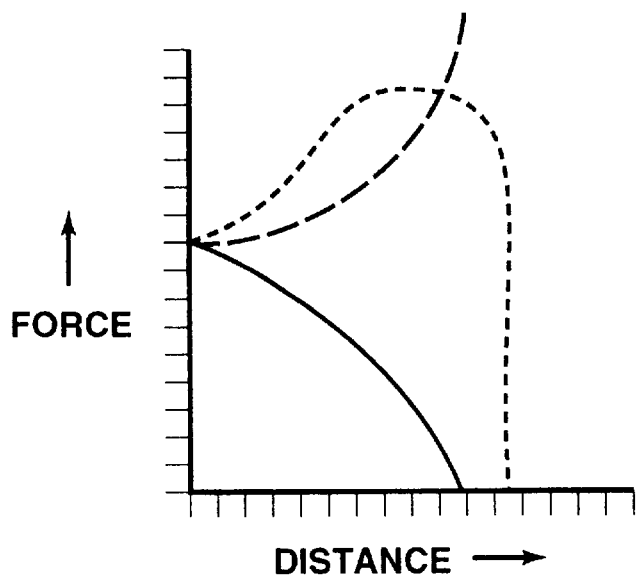
FIG. 9 is a diagrammatic view of a force displacement diagram.

As shown in the diagram of FIG. 9 the force required to separate the magnetic components decreases as the distance between the components increases on separation. This is illustrated by the solid line in FIG. 9. A device having spring means, shown in dotted line, or a device having a destructible mechanism shown in phantom line, will increase the forces applied to the tool on initial displacement as shown in FIG. 9 for comparison. For the safety of the personnel in the area of the robot arm or objects subject to collision, it is desirable that the force required to release the components immediately decreases, once the set force has been reached.

What is claimed is:

1. A breakaway unit for mounting a tool to a robot positioner, the breakaway unit comprising: a magnetic coupler mechanism having a first coupler component with means for attaching the breakaway unit to the robot positioner and a second coupler component with means for connecting the breakaway unit to the tool, wherein the coupler mechanism has a magnet member in one of the two coupler components and a magnetizable member in the other of the two coupler components wherein when the two coupler components are coupled, the magnet member and the magnetizable member are proximately positioned and the magnet member magnetically attracts the magnetizable member, wherein the coupler component having the magnetizable member is magnetically held to the coupler member having the magnet member with a holding force dependent on the distance of the magnet member from the magnetizable member, and, the coupler mechanism has a mechanical means for incrementally adjusting the relative distance between the magnet member and the magnetizable member for adjusting the holding force.

2. The breakaway unit of claim 1 further including: a mechanical coupler mechanism, the mechanical coupler mechanism having a seating component mounted to the second coupler component, and a breakaway component connectable to the seating component wherein the breakaway component has a mounting means for mounting the tool and the mechanical coupler mechanism comprises the means for connecting the breakaway unit to the tool.

3. The breakaway unit of claim 1 wherein the coupler component having the magnetizable member includes a housing with a recess, the magnetizable member being located in the recess, the adjustment means comprising adjustment screws with first ends projecting from the magnetizable member and contacting the magnetic member when the coupler components are coupled, wherein the magnet member is displaced from the magnetizable member by the adjustment screws.

4. The breakaway unit of claim 3 wherein the housing having the magnetizable member has magnetic retainer means for retaining the magnetizable member deep in the recess, and wherein the adjustment screws have second ends projecting through the housing, wherein displacing the ends of the adjustment screws projecting through the housing toward the housing displaces the magnetizable member toward the magnet member when the coupler components are coupled, thereby magnetically engaging the coupler components.

5. The breakaway unit of claim 1 having trigger means for stopping operation of the robot positioner when the coupler components of the magnetic coupler mechanism separate.

6. The breakaway unit of claim 5 wherein the trigger means comprises an electronic switch mechanism.

7. The breakaway unit of claim 2 wherein the mechanical coupler mechanism has adjustment means for adjusting the force required to separate the breakaway component from the seating component.

8. The breakaway unit of claim 2 wherein the tool has an axis and the breakaway component of the mechanical coupler mechanism is positioned to separate the breakaway component from the seating component in a direction along the axis of the tool during a compressive contact that tends to force the tool into the mounting means.

9. A breakaway unit for mounting a tool to a robot positioner the breakaway unit comprising: a magnetic coupler mechanism having a first coupler component with means for attaching the breakaway unit to the robot positioner and a second coupler component with means for connecting the breakaway unit to the tool, wherein the coupler mechanism has a magnet member in one of the two coupler components, and a magnetizable member in the other of the two coupler components and has means for adjusting the relative distance between the magnetic member and the magnetizable member wherein the coupler component having the magnetizable member includes a housing with a recess, the magnetizable member being located in the recess, the adjustment means comprising adjustment screws with first ends projecting from the magnetizable member and contacting the magnetic member when the coupler components are coupled, wherein the magnet member is displaced from the magnetizable member by the adjustment screws.

10. The breakaway unit of claim 9 wherein the housing having the magnetizable member has magnetic retainer means for retaining the magnetizable member deep in the recess, and wherein the adjustment screws have second ends projecting through the housing, wherein displacing the ends of the adjustment screws projecting through the housing toward the housing displaces the magnetizable member toward the magnet member when the coupler components are coupled, thereby magnetically engaging the coupler components.

11. The breakaway unit of claim 9 having trigger means for stopping operation of the robot positioner when the coupler components of the magnetic coupler mechanism separate.

12. The breakaway unit of claim 11 wherein the trigger means comprises an electronic switch mechanism.

13. A breakaway unit for mounting a tool to a robot positioner the breakaway unit comprising:

first and second coupler mechanisms, wherein the first coupler mechanism has a first coupler component with means for attaching the breakaway unit to the robot positioner and a second coupler component with a tool mount and means cooperating with means on the first coupler component for releasably connecting the second coupler component to the first coupler component with decoupling on a predetermined deflection force on the tool or tool mount; and, wherein the second coupler mechanism has a support structure with a mounting bracket displaced from the first coupler mechanism to releasably support the tool mount without interference from the first coupler mechanism and the robot positioner, the mounting bracket having a seating component with at least one pin receiving bushing, wherein the tool mount has a pin bracket with at least one pin insertable in the pin receiving bushing; wherein the pin and bushing have an axis capable of being substantially parallel with an axis of the tool, wherein when the pin of the pin bracket is inserted in the bushing of the seating component, the tool mount of the second coupler mechanism decouples from the support structure when the tool or tool mount contacts an object in a direction along the axis of the tool during a compressive contact that tends to force the tool or tool mount into the support structure.

14. The breakaway unit of claim 13 wherein the second coupler mechanism has means for adjusting the force required to decouple the tool mount from the support structure.

15. The breakaway unit of claim 14 wherein the pin bracket has three spaced pins insertable into three corresponding pin receiving bushings.

* * * * *